(12) United States Patent
Rhee et al.

(10) Patent No.: US 11,133,928 B2
(45) Date of Patent: Sep. 28, 2021

(54) METHOD AND APPARATUS FOR QUANTUM KEY DISTRIBUTION ON BASIS OF PHOTON SUBTRACTION FROM RECEIVER

(71) Applicant: Korea Advanced Institute of Science and Technology, Daejeon (KR)

(72) Inventors: June Koo Rhee, Daejeon (KR); Kyong Chun Lim, Daejeon (KR); Chang Ho Suh, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 106 days.

(21) Appl. No.: 16/608,954

(22) PCT Filed: Jan. 4, 2018

(86) PCT No.: PCT/KR2018/000183
§ 371 (c)(1),
(2) Date: Oct. 28, 2019

(87) PCT Pub. No.: WO2018/199426
PCT Pub. Date: Nov. 1, 2018

(65) Prior Publication Data
US 2020/0195428 A1    Jun. 18, 2020

(30) Foreign Application Priority Data

Apr. 27, 2017  (KR) .................. 10-2017-0054479

(51) Int. Cl.
*H04L 9/08*     (2006.01)
*H04B 10/70*    (2013.01)
*H04B 10/90*    (2013.01)

(52) U.S. Cl.
CPC .......... *H04L 9/0852* (2013.01); *H04B 10/70* (2013.01); *H04B 10/90* (2013.01); *H04L 9/0819* (2013.01)

(58) Field of Classification Search
CPC ....... H04B 10/70; H04B 10/90; H04L 9/0819; H04L 9/0852; H04L 9/0858
(Continued)

(56) References Cited

U.S. PATENT DOCUMENTS

2006/0263096 A1* 11/2006 Dinu .................. H04L 9/0858
398/187
2011/0075839 A1    3/2011 Noh
(Continued)

FOREIGN PATENT DOCUMENTS

JP    2008541660 A    11/2008
JP    2014241481 A    12/2014
(Continued)

OTHER PUBLICATIONS

Ottaviani et al; Continuous-variable quantum cryptography with an untrusted relay: Detailed security analysis of the symmetric Configuration; Jun. 2015; Department of Computer science, University of York, pp. 1-10. (Year: 2015).*
(Continued)

*Primary Examiner* — Amritbir K Sandhu
(74) *Attorney, Agent, or Firm* — The Webb Law Firm

(57) ABSTRACT

The present invention relates to a method and an apparatus for quantum key distribution according to a continuous-variable quantum key distribution protocol, which distributes the quantum key in a reverse post-processing manner and, after photon sub traction at a receiver (Bob), detects bit information from a received quantum state to calculate and share the quantum key, such that security can be further enhanced and a cryptographic key generation rate can be increased since the cryptographic key is not exposed to an attacker (Eve).

9 Claims, 5 Drawing Sheets

(58) Field of Classification Search
USPC .................................. 370/278, 279; 380/278
See application file for complete search history.

(56) References Cited

U.S. PATENT DOCUMENTS

| | | | | |
|---|---|---|---|---|
| 2011/0127415 | A1* | 6/2011 | Kanter | G01D 18/00 250/252.1 |
| 2014/0363174 | A1 | 12/2014 | Azuma et al. | |
| 2020/0044749 | A1* | 2/2020 | Rauschenbach | H04L 9/0858 |
| 2020/0266978 | A1* | 8/2020 | Li | H04L 9/0662 |
| 2020/0394537 | A1* | 12/2020 | Wang | G06N 10/00 |

FOREIGN PATENT DOCUMENTS

| | | |
|---|---|---|
| KR | 1020070078666 A | 8/2007 |
| KR | 1020090124679 A | 12/2009 |

OTHER PUBLICATIONS

Xu et al; Measurement-device-independent quantum cryptography; Aug. 2014; IEE Journal of selected topics in Quantum Electronics; pp. 1-11. (Year: 2014).*

Hirano et al; Implementation of continuous-variable quantum key distribution with discrete modulation; Jun. 2017; IOP publishing; pp. 1-16. (Year: 2017).*

Ottaviani et al; Continuous variable cryptography with an untrusted relay: Detailed security analysis of the symmetric configuration; Jun. 2015; Department of Computer Science, University of York, pp. 1-10. (Year: 2015).*

Guo et al ; Performance improvement of continuous-variable quantum key distribution with an entangled source in the middle via photon subtraction; Mar. 2017;Physical Review A95; pp. 1-9. (Year: 2017).*

Zhong et al; Virtual zero-photon catalysis for improving continuous-variable quantum key distribution via Gaussian post-selection; 2020; Scientific reports; [pp. 1-12. (Year: 2020).*

Marek et al; Loop-based subtraction of a single photon from a travelling beam of light; Oct. 2018; Department of Optics; pp. 1-11. (Year: 2018).*

Huang et al., "Performance improvement of continuous-variable quantum key distribution via photon subtraction", Physical Review A, 2013, 7 pages, vol. 7, Article 012317.

Im et al., "Research on photon-based quantum information", Optical Science and Technology, 2014, pp. 6-12, vol. 18, No. 2, English-language Abstract.

Lee et al., "Privacy Amplification of Quantum Key Distribution Systems Using Continuous Variable", Journal of Satellite, Information and Communications, 2016, pp. 1-5, vol. 11, Issue 3, English-language Abstract.

Yoo, "Quantum mechanics and quantum information: Error correction scheme using Hamming codes", Master's Thesis for the Degree of Education, Seoul National University, 2014, 60 pages, English-language Abstract.

* cited by examiner

METHOD AND APPARATUS FOR QUANTUM
KEY DISTRIBUTION ON BASIS OF PHOTON
SUBTRACTION FROM RECEIVER

CROSS-REFERENCE TO RELATED
APPLICATIONS

This application is the United States national phase of International Application No. PCT/KR2018/000183 filed Jan. 4, 2018, and claims priority to Korean Patent Application No. 10-2017-0054479 filed Apr. 27, 2017, the disclosures of which are hereby incorporated by reference in their entirety.

TECHNICAL FIELD

The present invention relates to a method and an apparatus for quantum key distribution, and particularly, to a method and an apparatus for quantum key distribution according to a continuous-variable quantum key distribution protocol, which distribute a quantum key and detect bit information from a received quantum state after photon subtraction at a receiver to calculate and share the quantum key.

BACKGROUND ART

In a continuous variable quantum key distribution protocol (CVQKD) in the related art, reverse postprocessing is used. For example, a transmitter (Alice) transmits a quantum state generated for coded key information through a quantum channel and a receiver (Bob) notifies to the transmitter (Alice) reference information applied to detection of the quantum state and the transmitter (Alice) detects the transmitted quantum state according to the reference information from the receiver (Bob) and applies postprocessing such as error correction based on the detected data to calculate a quantum key.

On the other hand, while damage cases according to information leakage due to wiretapping have continuously occurred in recent years, an interest in security has significantly increased and a cryptographic key distribution scheme according to the continuous-variable quantum key distribution protocol in the related art provides security to some degree by distributing and sharing a cryptographic key between users at remote places by using a quantum mechanical property of a photon. However, in general, an attacker (Eve) may estimate quantum key information corresponding to photons transmitted through optical detection by reacting with the quantum states of the photons which the transmitter (Alice) transmits by using a predetermined copying device in the quantum channel. When the attacker (Eve) attempts to acquire the cryptographic key information distributed between the users, the quantum key information may be altered by the quantum mechanical property of the quantum state, and as a result, existence of the attacker (Eve) may be detected.

In order to solve such a security, the transmitter (Alice) transmits the quantum state to the quantum channel and there may be a case in which the transmitter (Alice) copes with an attack of the quantum channel by the attacker (Eve) by transmitting the quantum state when photons of an intended number are subtracted. However, even in such a scheme, since it is difficult to completely determine an attack possibility by the attacker (Eve), there is a problem in that the cryptographic key is exposed to the attacker (Eve).

As a literature in the related art, which is related to the quantum key distribution, American Physical Society, pp. 012317-1 to pp. 012317-7, Performance improvement of continuous-variable quantum key distribution via photon subtraction, 2013, etc., may be referred.

DISCLOSURE

Technical Problem

Accordingly, the present invention is contrived to solve the aforementioned problem and an object of the present invention is to provide a method and an apparatus for quantum key distribution according to a continuous-variable quantum key distribution protocol, which may distribute a quantum key in a reverse postprocessing manner and may further enhance security because a cryptographic key is not exposed to an attacker (Eve) and detect bit information from a received quantum state after photon subtraction at a receiver (Bob) to calculate and share the quantum key so as to increase a cryptographic key generation rate.

Technical Solution

First, when a feature of the present invention is summarized, in order to achieve such an object, a method for quantum key distribution according to an aspect of the present invention includes: (A) transmitting, by a transmitter, a quantum state for a coded cryptographic key through a quantum channel; (B) performing, by a receiver, photon subtraction from the quantum state received through the quantum channel and then performing state detection for the quantum state by applying a selected quadrature; and (C) performing, by the transmitter, the state detection for the quantum state by applying the quadrature received from the receiver through a public channel.

The receiver predetermines whether the quantum state is altered by an attacker in the quantum channel according to whether to subtract the photons before the state detection to prevent the cryptographic key from being exposed to the attacker and increase a cryptographic key generation rate.

Step (B) includes performing the photon subtraction from reflected light of the quantum state and transmission light of reference light by using a beam splitter.

Step (B) includes controlling to perform the state detection when a predetermined target quantum number is subtracted for a predetermined time in performing the photon subtraction.

Alternatively, step (B) includes storing the quantum state in a quantum memory, determining the target number of photons to be subtracted according to a noise level of the quantum channel while the quantum state is stored in the quantum memory, and controlling to perform the state detection when the target quantum number is subtracted for the predetermined time in performing the photon subtraction.

The quantum state may be a single quantum state including a squeezed state or a coherent state.

Further, the quantum state may be an entangled quantum state, a partial output of the beam splitter generating the entangled quantum state in step (A) may be transmitted, and the state detection for the remaining output of the beam splitter may be performed in step (C).

Further, an apparatus for quantum key distribution according to another aspect of the present invention includes: a transmitter transmitting a quantum state for a coded cryptographic key through a quantum channel; and a receiver performing photon subtraction from the quantum state received through the quantum channel and then performing state detection for the quantum state by applying a selected quadrature, in which the transmitter performs the state detection for the quantum state by applying the quadrature received from the receiver through a public channel.

Further, a receiver for being distributed a quantum key according to yet another aspect of the present invention includes: a photon subtractor performing photon subtraction from a quantum state for a coded cryptographic key received from a transmitter; and an optical detection unit generating bit information depending on a quantum state of light, in which the photon subtractor generates a state detection control signal after the photon subtraction and controls the optical detection unit to perform state detection for the quantum state by applying a selected quadrature, and the transmitter performs the state detection for the quantum state by applying the quadrature received through a public channel.

The receiver may further include a quantum memory storing the quantum state transmitted by the transmitter, in which the photon subtractor may perform the photon subtraction from the quantum state output from the quantum memory.

In addition, a transmitter for distributing a quantum key according to still yet another aspect of the present invention includes: a transmitter transmitting a part of an entangled quantum state for a coded cryptographic key through a quantum channel; a quantum memory storing the remaining quantum state other than the part of the entangled quantum state; and an optical detection unit generating bit information depending on a quantum state of light, in which a receiver performs photon subtraction from the part of the entangled quantum state received through the quantum channel and then performing state detection for the part of the entangled quantum state by applying a selected quadrature, and the optical detection unit performs the state detection for the remaining quantum state other than the part of the entangled quantum state by applying the quadrature received from the receiver through a public channel.

Advantageous Effects

According to a method and an apparatus for quantum key distribution according to the present invention, a receiver (Bob) detects bit information from a received quantum state through photon subtraction and calculates and shares a quantum key through postprocessing such as error correction, privacy amplification, etc., to further enhance security because a cryptographic key is not exposed to an attacker (Eve) and increase a cryptographic key generation rate.

BEST MODE

Figure 1:
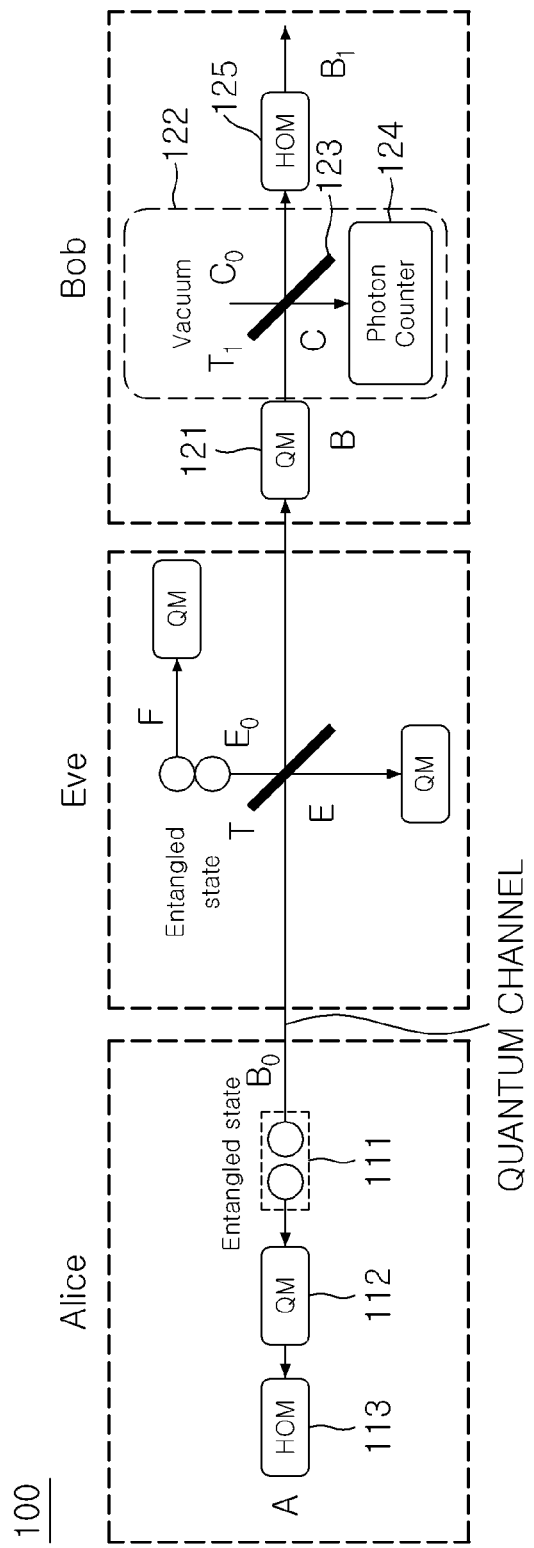
FIG. 1 is a block diagram for an apparatus for quantum key distribution according to a continuous-variable quantum key distribution protocol according to an embodiment of the present invention.

Hereinafter, the present invention will be described in detail with reference to the accompanying drawings. In this case, the same components in each drawing are represented by the same reference numerals as much as possible. In addition, detailed descriptions of already known functions and/or configurations are omitted. The following description focuses on parts necessary for understanding the operation according to various embodiments, and descriptions of elements that may obscure the gist of the description are omitted. In addition, some components of the drawings may be exaggerated, omitted, or schematically illustrated. The size of each component does not entirely reflect the actual size, and thus the contents described herein are not limited by the relative size or spacing of the components drawn in the respective drawings.

FIG. 1 is a block diagram for an apparatus 100 for quantum key distribution according to a continuous-variable quantum key distribution protocol according to an embodiment of the present invention.

Referring to FIG. 1, an apparatus 100 for quantum key distribution according to a continuous-variable quantum key distribution protocol according to an embodiment of the present invention includes a transmitter (Alice) and a receiver (Bob) that transmit and receive an optical signal for transmitting and receiving data through a quantum channel using an optical fiber in an optical communication network.

The transmitter (Alice) and the receiver (Bob) may be included in various optical communication equipments on a network, i.e., a network providing a public channel, such as a wired/wireless Internet, a mobile communication network, etc. For example, Ethernet equipment, L2/L3 equipment, a server on the network, etc., may include a transmitter (Alice) and a receiver (Bob) for providing or receiving the quantum key according to the continuous-variable quantum key distribution protocol in order to transmit and receive mutually required data through optical communication.

First, the operations of the transmitter (Alice) and the receiver (Bob) will be described in brief.

In the present invention, a transmitter (Alice) for distributing the quantum key and a receiver (Bob) for being distributed the quantum key may distribute and share the cryptographic key by using reverse postprocessing.

First, the transmitter (Alice) transmits a part ($B_0$) (a first port output of a beam splitter) of an entangled-state quantum generated by using a beam splitter through the quantum channel with respect to a predetermined coded cryptographic key corresponding to a transmission target cryptographic key.

As a result, the receiver (Bob) receives a part $B_0$ of the corresponding entangled quantum state through the quantum channel and performs photon subtraction from the received entangled quantum state B and then performs state detection according to a homodyne (HOM) scheme for the entangled quantum state by applying an arbitrarily selected quadrature among in-phase (p) and quadrature-phase (q) quadrature to generate a corresponding electrical signal, i.e., bit information (digital code) $B_1$.

Thereafter, all predetermined prepared entangled quantum states are transmitted and received by such a scheme and then the receiver (Bob) transmits information on the quadrature selected for application to the state detection through the public channel to the transmitter (Alice) and the transmitter (Alice) applies the quadrature which is the same as the quadrature received from the receiver (Bob) and performs the state detection according to the homodyne (HOM) scheme with respect to the remaining (a second port output of the beam splitter generating the entangled quantum state) other than the part of the entangled quantum state transmitted to the receiver (Bob), thereby generating the electrical signal, i.e., the bit information (digital code) A.

In this case, during transmitting and receiving the optical signal between the transmitter (Alice) and the receiver (Bob), a quantum-state signal is altered or noise is applied by an external environment or an attack by the attacker (Eve) in the quantum channel, and as a result, signal values ($A/B_1$) detected by the transmitter (Alice) and the receiver (Bob) may not coincide with each other. For example, the attacker (Eve) may react a part ($E_0$) of the entangled quantum state thereof, which is transmitted by the transmitter (Alice) through a beam splitter (transmittance T) disposed on an optical signal transmission/reception path between the transmitter (Alice) and the receiver (Bob) and estimate the quantum key information corresponding to the photons transmitted through the optical detection from the remaining part (F) of the entangled quantum state thereof and a quantum state after reaction, which are stored in respective quantum memories (QMs), by using the predetermined copying device in the quantum channel as illustrated in FIG. 1.

By coping with the alteration or noise, the transmitter (Alice) and the receiver (Bob) calculate and share the quantum key corrected by applying postprocessing, i.e., an error correction technique and a privacy amplification technique to the corresponding bit information generated by performing the state detection as described above in order to match the detected bit information. For example, the transmitter (Alice) receives the bit information detected by the receiver (Bob) through the public channel and performs error correction based on the received bit information to match the bit information of the receiver (Bob) and bit information thereof. On the contrary, the receiver (Bob) receives the bit information detected by the transmitter (Alice) and performs the error correction based on the received bit information to match the bit information of the transmitter (Alice) and the bit information thereof.

In the present invention, as described above, the receiver (Bob) predetermines whether the quantum state is altered by the attacker (Eve) in the quantum channel according to whether photon subtraction is performed before detecting the state for acquiring the bit information to prevent the cryptographic key from being exposed to the attacker (Eve) and increase the cryptographic key generation rate.

To this end, as illustrated in FIG. 1, the transmitter (Alice) includes a transmission unit 111, a quantum memory (QM) 112, and an optical detection unit 113 generating the electrical signal by the homodyne (HOM) scheme.

The receiver (Bob) includes a quantum memory (QM) 121, a photon subtractor 122, and an optical detection unit 125 generating the electrical signal in the homodyne (HOM) scheme.

Hereinafter, operations of components of the apparatus 100 for quantum key distribution according to an embodiment of the present invention will be described in more detail with reference to the flowchart of FIG. 2.

Figure 2:
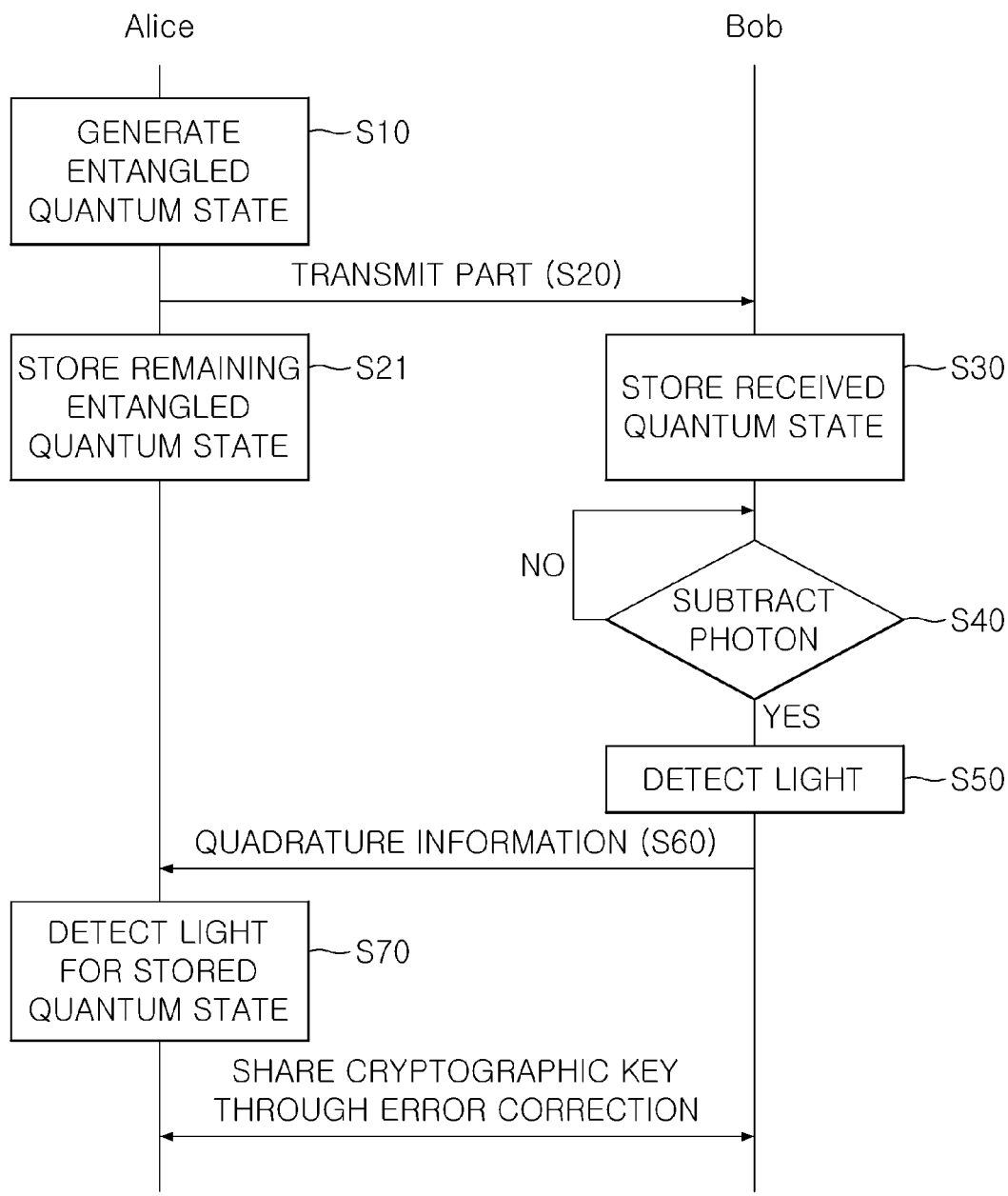
FIG. 2 is a flowchart for describing an operation of an apparatus for quantum key distribution according to an embodiment of the present invention.

FIG. 2 is a flowchart for describing an operation of an apparatus 100 for quantum key distribution according to an embodiment of the present invention.

Referring to FIG. 2, first, the transmission unit 111 generates an entangled quantum state for a predetermined coded cryptographic key corresponding to a cryptographic key to be transmitted (S10) and transmits a part thereof, i.e., a part ($B_0$) of the entangled quantum state generated by using the beam splitter through the quantum channel (S20). The quantum memory 112 stores the remaining entangled quantum state other than a part ($B_0$) of the entangled quantum state split and output from the beam splitter (S21).

Here, the entangled quantum state as a two mode squeezed vacuum (TMSV) state as a quantum state output when synthesizing quantum light of a squeezed state of two modes by a 5:5 beam splitter may be generated as the entangled quantum state in which in-phase (p) and quadrature-phase (q) quadratures, i.e., phases are orthogonal to each other through the beam splitter. In this case, the squeezed states of two modes output are represented as continuous variable entangled states and mutually entangled with respect to the number of photons. That is, in regard to the entangled quantum state, while quantum states of two modes are entangled in the TMSV state, respective quantum states have the same variance. Here, the variance is a variance for amplitudes in the p and q quadratures of the quantum state of each mode. Since an optical theory related to the entangled quantum state is well known, a more detail description will be omitted.

Meanwhile, when the transmitter (Alice) transmits a part ($B_0$) of the generated entangled quantum state through the quantum channel, the receiver (Bob) receives a part $B_0$ of the corresponding entangled quantum state through the quantum channel and performs photon subtraction from the received corresponding entangled quantum state B and then perform state detection according to a homodyne (HOM) scheme for the entangled quantum state B by applying an arbitrarily selected quadrature among in-phase (p) and quadrature-phase (q) quadrature to generate a corresponding electrical signal, i.e., bit information (digital code) (S30 to S50).

That is, in more detail, first, the quantum memory 121 of the receiver (Bob) stores a part ($B_0$) of the entangled quantum state received from the transmitter (Alice) through the quantum channel and outputs the part ($B_0$) by delaying a predetermined time (S30). The entangled quantum state output from the quantum memory 121 will be marked with B.

The photon subtractor 122 performs photon subtraction from the entangled quantum state B output from the quantum memory 121 by using a beam splitter 123 and a photon counter 124 (S40). The photon subtractor 122 may control to activate a state detection control signal to operate the optical detection unit 125 when the photon subtraction is performed according to whether to subtract the photons.

To this end, the photon subtractor 122 may determine the number of target photons to be subtracted according to a noise level of the quantum channel while the entangled quantum state is stored in the quantum memory 121. For example, when a plurality of entangled quantum states for the coded cryptographic key transmitted from the transmitter (Alice) is stored in the quantum memory 121, a predetermined processor of the photon subtractor 122 performs channel estimation for a transmission rate, a noise variance, etc., based on the stored quantum states to determine the target number of photons to be subtracted according to the noise level of the quantum channel based on the channel estimation. The target photon number may be determined as N (a natural number) to be subtracted for a predetermined time (e.g., a time slot in which the coded symbol is transmitted). When the target photon number is determined, the photon subtractor 122 may perform photon subtraction from light C in which reflected light of the entangled quantum state B output from the quantum memory 121 and transmission light of reference light $C_0$ are synthesized with each other by using the beam splitter 123 (e.g., transmittance $T_1$). The photon subtractor 122 may control to activate a state detection control signal to operate the optical detection unit 125 when the target photon number is subtracted by performing the photon subtraction.

The optical detection unit 125 for generating the bit information according to the quantum state of input light performs state detection according to a homodyne (HOM) scheme for the received entangled quantum state corresponding to the coded cryptographic key by applying an arbitrarily selected quadrature among in-phase (p) and quadrature-phase (q) quadrature according to the activated state detection control signal to generate a corresponding electrical signal, i.e., bit information (digital code) $B_1$ (S50).

Thereafter, after all entangled quantum states prepared for predetermined time slots for the cryptographic key coded by such a scheme are transmitted and received, the receiver (Bob) transmits to the transmitter (Alice) information on the quadrature selected for application to the state detection through the public channel by using a predetermined transmission unit (S60).

The optical detection unit 113 of the transmitter (Alice) generates the corresponding electrical signal, i.e., bit information (digital code) A by performing the state detection according to the homodyne (HOM) scheme with respect to the remaining quantum state of the entangled quantum state stored in the quantum memory 112 except for a part ($B_0$) of the entangled quantum state transmitted to the receiver (Bob) by applying the quadrature which is the same as the quadrature received from the receiver (Bob) (S70).

Thereafter, the transmitter (Alice) and the receiver (Bob) calculate and share the quantum key corrected by applying postprocessing, i.e., an error correction technique and a privacy amplification technique to the corresponding bit information generated by performing the state detection as described above in order to match the detected bit information. For example, the transmitter (Alice) receives the bit information detected by the receiver (Bob) through the public channel and performs error correction based on the received bit information to match the bit information of the receiver (Bob) and bit information thereof. On the contrary, the receiver (Bob) receives the bit information detected by the transmitter (Alice) and performs the error correction based on the received bit information to match the bit information of the transmitter (Alice) and the bit information thereof.

Figure 3:
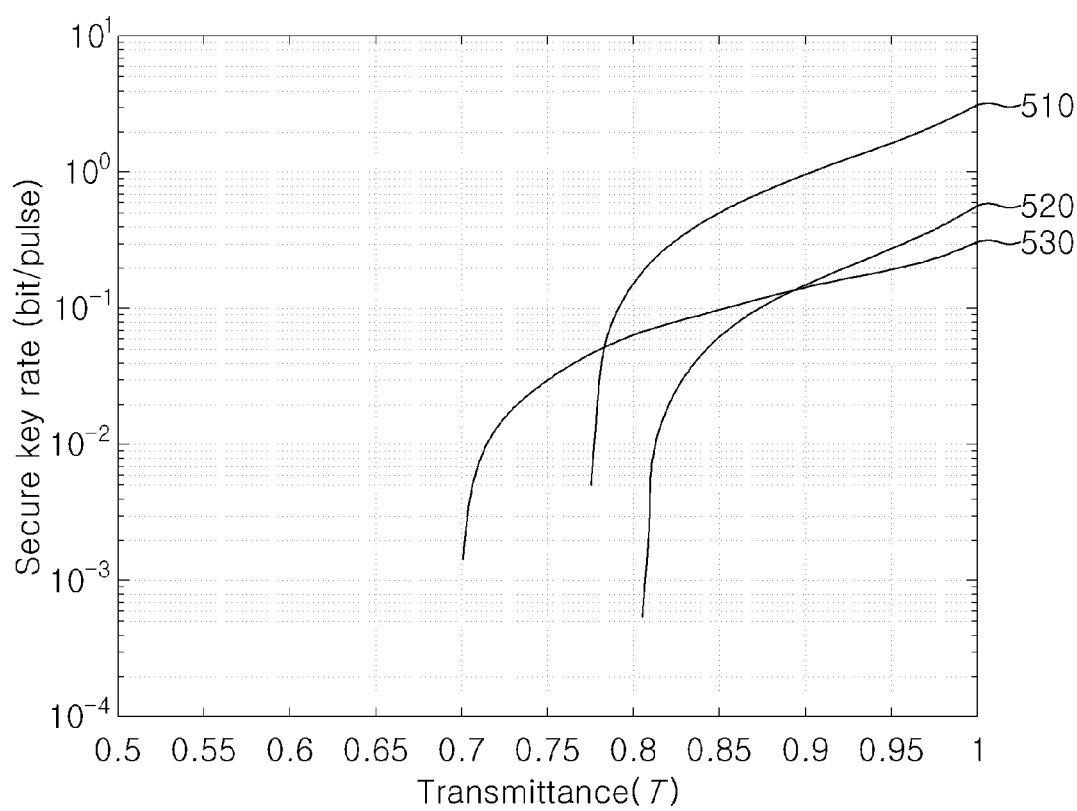
FIG. 3 is a graph for describing a cryptographic key generation rate performance according to an embodiment of the present invention.

FIG. 3 is a graph for describing a cryptographic key generation rate performance according to an embodiment of the present invention.

In FIG. 3, experimental results of a secure key generation rate for a case of a general continuous-variable quantum key distribution (CVQKD) protocol using the squeezed state (510), a case of a photon subtraction scheme in the transmitter (Alice) (520), and a case of the present invention illustrated in FIG. 1 (530) are compared and illustrated. The experimental results relate to a case where the average number of photons of each of both quantum states of the TMSV state described above is set to 4 and the average number of photons in the quantum channel is set to 1 due to the noise by the attack using the beam splitter (transmittance T) by the attacker (Eve). As illustrated in FIG. 3, it is confirmed that the secure key rate is shown excellently even though in the case (530) of the present invention, the noise by the beam splitter (transmittance T) of the attacker (Eve) increases as compared with the case in the related art.

Figure 4:
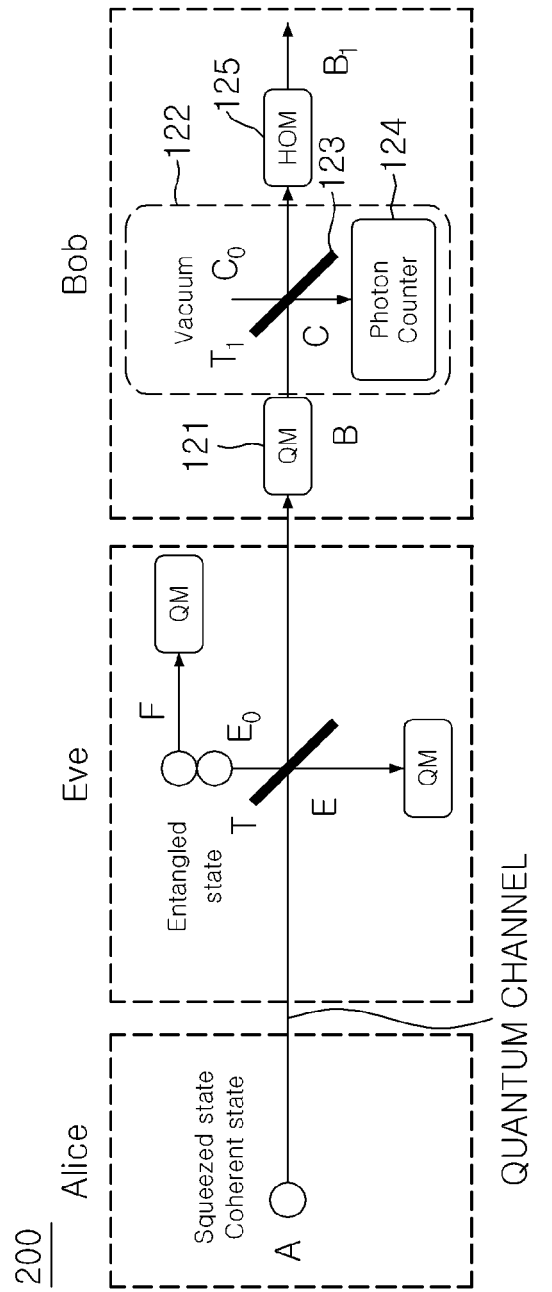
FIG. 4 is a block diagram for an apparatus for quantum key distribution according to a continuous-variable quantum key distribution protocol according to an embodiment of the present invention.
Figure 5:
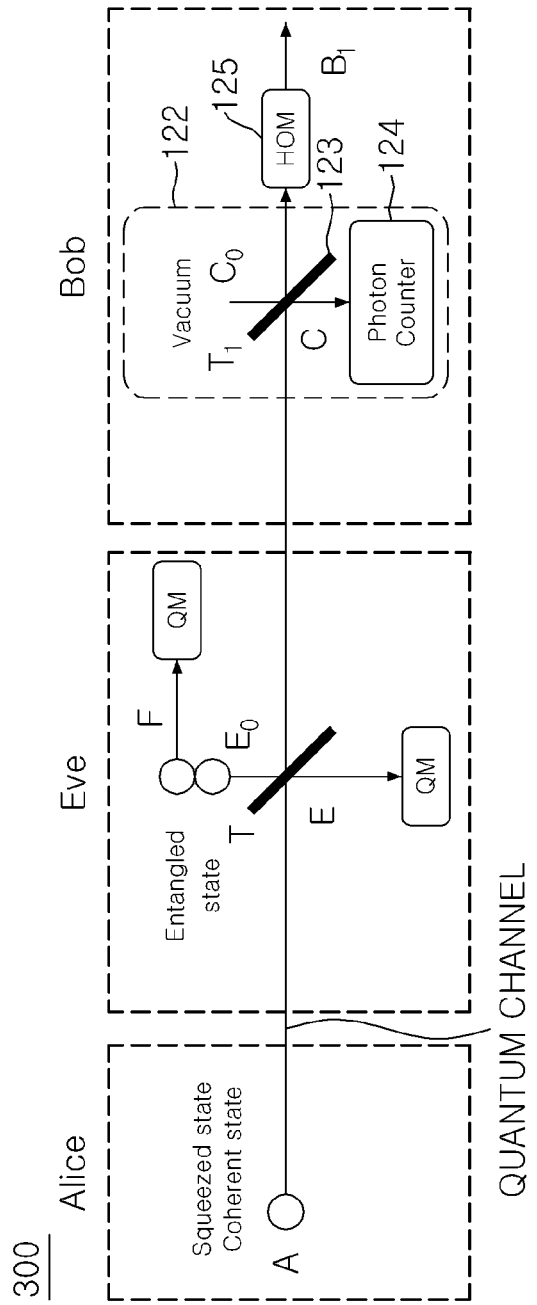
FIG. 5 is a block diagram for an apparatus for quantum key distribution according to a continuous-variable quantum key distribution protocol according to another embodiment of the present invention.

Meanwhile, in FIGS. 1 and 2, the method is described in which the transmitter (Alice) distributes and shares the cryptographic key with the receiver (Bob) by using the entangled quantum state, but hereinafter, a method will be described in which the transmitter (Alice) distributes and shares the cryptographic key by using a single squeezed state or coherent state as illustrated in FIGS. 4 and 5 instead of the entangled quantum state.

A beam or light may be modulated in single quantum states such as the squeezed state and the coherent state according to a modulation scheme and whether squeezing is performed and generated as the single quantum state in which in-phase (p) and quadrature-phase (q) quadratures, i.e., the phases are orthogonal to each other and an optical theory related to the single quantum state (squeezed state or coherent state) is well known, and as a result, a more detailed description will be omitted.

FIG. 4 is a block diagram for an apparatus 200 for quantum key distribution according to a continuous-variable quantum key distribution protocol according to another embodiment of the present invention.

Referring to FIG. 4, the apparatus 200 for quantum key distribution according to another embodiment of the present invention is similar to the apparatus of FIG. 1, but the quantum memory 112 of the transmitter (Alice) and the optical detection unit 113 generating the electrical signal in the homodyne (HOM) scheme are omitted from FIG. 1. The operation in the receiver (Bob) is performed similar to S30 to S60 of FIG. 2.

That is, in the transmitter (Alice), a predetermined transmission unit generates a single quantum state (squeezed state or coherent state) A for a predetermined coded cryptographic key corresponding to the cryptographic key to be transmitted and immediately transmits the generated single quantum state A through the quantum channel.

The quantum memory 121 of the receiver (Bob) stores the single quantum state (squeezed state or coherent state) received from the transmitter (Alice) through the quantum channel and outputs the single quantum state by delaying a predetermined time. The single quantum state (squeezed state or coherent state) output from the quantum memory 121 will be marked with B.

The photon subtractor 122 performs photon subtraction from the single quantum state B output from the quantum memory 121 by using a beam splitter 123 and a photon counter 124. The photon subtractor 122 may control to activate a state detection control signal to operate the optical detection unit 125 when the photon subtraction is performed according to whether to subtract the photons.

To this end, the photon subtractor 122 may determine the number of target photons to be subtracted according to a noise level of the quantum channel while the single quantum state is stored in the quantum memory 121. For example, when a plurality of single quantum states for the coded cryptographic key transmitted from the transmitter (Alice) is stored in the quantum memory 121, a predetermined processor of the photon subtractor 122 performs channel estimation for a transmission rate, a noise variance, etc., based on the stored quantum state to determine the target number of photons to be subtracted according to the noise level of the quantum channel based on the channel estimation. The target quantum number may be determined as N (a natural number) to be subtracted for a predetermined time (e.g., a time slot in which the coded symbol is transmitted). When the target photon number is determined, the photon subtractor 122 may perform photon subtraction from light C in which reflected light of the single quantum state B output from the quantum memory 121 and transmission light of reference light $C_0$ are synthesized with each other by using the beam splitter 123 (e.g., transmittance $T_1$). The photon subtractor 122 may control to activate a state detection control signal to operate the optical detection unit 125 when the target photon number is subtracted by performing the photon subtraction.

The optical detection unit 125 for generating the bit information according to the quantum state of input light performs state detection according to a homodyne (HOM) scheme for the received single quantum state B corresponding to the coded cryptographic key by applying an arbitrarily selected quadrature among in-phase (p) and quadrature-phase (q) quadrature according to the activated state detection control signal to generate a corresponding electrical signal, i.e., bit information (digital code) $B_1$.

Thereafter, after all single quantum states prepared for predetermined time slots for the cryptographic key coded by such a scheme are transmitted and received, the receiver (Bob) transmits to the transmitter (Alice) information on the quadrature selected for application to the state detection through the public channel by using a predetermined transmission unit.

The predetermined optical detection unit in the transmitter (Alice) immediately performs the state detection with respect to the single quantum state (squeezed state or coherent state) transmitted to the receiver (Bob) without using the homodyne (HOM) scheme by applying the quadrature which is the same as the quadrature received from the receiver (Bob) to generate the corresponding electrical signal, i.e., the bit information (digital code).

Thereafter, the transmitter (Alice) and the receiver (Bob) calculate and share the quantum key corrected by applying postprocessing, i.e., an error correction technique and a privacy amplification technique to the corresponding bit information generated by performing the state detection as described above in order to match the detected bit information. For example, the transmitter (Alice) receives the bit information detected by the receiver (Bob) through the public channel and performs error correction based on the received bit information to match the bit information of the receiver (Bob) and bit information thereof. On the contrary, the receiver (Bob) receives the bit information detected by the transmitter (Alice) and performs the error correction based on the received bit information to match the bit information of the transmitter (Alice) and the bit information thereof.

FIG. 5 is a block diagram for an apparatus 300 for quantum key distribution according to a continuous-variable quantum key distribution protocol according to yet another embodiment of the present invention.

Referring to FIG. 5, the apparatus 300 for quantum key distribution according to yet another embodiment of the present invention is similar to the apparatus of FIG. 4, but the quantum memory 121 of the receiver (Bob) is omitted from FIG. 4.

That is, in the transmitter (Alice), a predetermined transmission unit generates a single quantum state (squeezed state or coherent state) A for a predetermined coded cryptographic key corresponding to the cryptographic key to be transmitted and immediately transmits the generated single quantum state A through the quantum channel.

When the receiver (Bob) receives the corresponding single quantum state (squeezes state or coherent state) from the transmitter (Alice) through the quantum channel, the photon subtractor 122 performs photon subtraction from the received single quantum state B by using the beam splitter 123 and the photon counter 124. The photon subtractor 122 may control to activate a state detection control signal to operate the optical detection unit 125 when the photon subtraction is performed according to whether to subtract the photons. The photon subtractor 122 may perform photon subtraction from light C in which reflected light of the received single quantum state B and transmission light of reference light $C_0$ are synthesized with each other by using the beam splitter 123 (e.g., transmittance $T_1$). The photon subtractor 122 may control to activate a state detection control signal to operate the optical detection unit 125 when a predetermined target photon number is subtracted by performing the photon subtraction.

The optical detection unit 125 for generating the bit information according to the quantum state of input light performs state detection according to a homodyne (HOM) scheme for the received single quantum state B corresponding to the coded cryptographic key by applying an arbitrarily selected quadrature among in-phase (p) and quadrature-phase (q) quadrature according to the activated state detection control signal to generate a corresponding electrical signal, i.e., bit information (digital code) $B_1$.

Thereafter, after all single quantum states prepared for predetermined time slots for the cryptographic key coded by such a scheme are transmitted and received, the receiver (Bob) transmits to the transmitter (Alice) information on the quadrature selected for application to the state detection through the public channel by using a predetermined transmission unit.

The predetermined optical detection unit in the transmitter (Alice) immediately performs the state detection with respect to the single quantum state (squeezed state or coherent state) transmitted to the receiver (Bob) without using the homodyne (HOM) scheme by applying the quadrature which is the same as the quadrature received from the receiver (Bob) to generate the corresponding electrical signal, i.e., the bit information (digital code).

Thereafter, the transmitter (Alice) and the receiver (Bob) calculate and share the quantum key corrected by applying postprocessing, i.e., an error correction technique and a privacy amplification technique to the corresponding bit information generated by performing the state detection as described above in order to match the detected bit information. For example, the transmitter (Alice) receives the bit information detected by the receiver (Bob) through the public channel and performs error correction based on the received bit information to match the bit information of the receiver (Bob) and bit information thereof. On the contrary, the receiver (Bob) receives the bit information detected by the transmitter (Alice) and performs the error correction based on the received bit information to match the bit information of the transmitter (Alice) and the bit information thereof.

As described above, according to the apparatus 100 for quantum key distribution according to the present invention, a receiver (Bob) detects bit information from a received quantum state through photon subtraction and calculates and shares a quantum key through postprocessing such as error correction, privacy amplification, etc., in quantum key distribution in a reverse postprocessing manner to further enhance security because a cryptographic key is not exposed to an attacker (Eve) and increase a cryptographic key generation rate.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from a scope without departing from an essential characteristic of the present invention. Accordingly, the spirit of the present invention should not be defined only by the described embodiments, and it should be appreciated that claims to be described below and all technical spirit which is equivalent to the claims or equivalently modified is included in the claim of the present invention.

The invention claimed is:

1. A method for quantum key distribution, the method comprising:
   (a) transmitting, by a transmitter, a quantum state for a coded cryptographic key through a quantum channel;
   (b) performing, by a receiver, photon subtraction from the quantum state received through the quantum channel and then performing state detection for the quantum state by applying a selected quadrature; and
   (c) performing, by the transmitter, the state detection for the quantum state by applying the quadrature received from the receiver through a public channel,
   wherein step (b) includes controlling to perform the state detection when a predetermined target photon number is subtracted for a predetermined time in performing the photon subtraction.

2. The method of claim 1, wherein the receiver predetermines whether the quantum state is altered by an attacker in the quantum channel according to whether to subtract the photons before the state detection to prevent the cryptographic key from being exposed to the attacker and increase a cryptographic key generation rate.

3. The method of claim 1, wherein step (b) includes performing the photon subtraction from reflected light of the quantum state and transmission light of reference light by using a beam splitter.

4. The method of claim 1, wherein the quantum state is a single quantum state including a squeezed state or a coherent state.

5. The method of claim 1, wherein the quantum state is an entangled quantum state,
   a partial output of the beam splitter generating the entangled quantum state in step (a) is transmitted, and the state detection for a remaining output of the beam splitter is performed in step (c).

6. A method for quantum key distribution, the method comprising:
   (a) transmitting, by a transmitter, a quantum state for a coded cryptographic key through a quantum channel;
   (b) performing, by a receiver, photon subtraction from the quantum state received through the quantum channel and then performing state detection for the quantum state by applying a selected quadrature; and
   (c) performing, by the transmitter, the state detection for the quantum state by applying the quadrature received from the receiver through a public channel,
   wherein step (b) includes
      storing the quantum state in a quantum memory,
      determining a corresponding target number of photons to be subtracted according to a noise level of the quantum channel while the quantum state is stored in the quantum memory, and
      controlling to perform the state detection when the target photon number is subtracted for the predetermined time in performing the photon subtraction.

7. An apparatus for quantum key distribution, the apparatus comprising:
   a transmitter transmitting a quantum state for a coded cryptographic key through a quantum channel; and
   a receiver performing photon subtraction from the quantum state received through the quantum channel and then performing state detection for the quantum state by applying a selected quadrature,
   wherein the transmitter performs the state detection for the quantum state by applying the quadrature received from the receiver through a public channel, and
   the receiver controls to perform the state detection when a predetermined target photon number is subtracted for a predetermined time in performing the photon subtraction.

8. A receiver for being distributed a quantum key, the receiver comprising:
   a quantum memory storing a quantum state for a coded cryptographic key received from a transmitter;
      a photon subtractor performing photon subtraction from the quantum state output from the quantum memory; and
      an optical detector generating bit information based on a homodyne detection depending on a quantum state of light,
   wherein the photon subtractor generates a state detection control signal after the photon subtraction and controls the optical detection unit to perform state detection for the quantum state by applying a selected quadrature, and the transmitter performs the state detection for the quantum state by applying the quadrature received through a public channel, and
   wherein the photon subtractor controls to perform the state detection when a predetermined target photon number is subtracted for a predetermined time in performing the photon subtraction.

9. A transmitter for distributing a quantum key, the transmitter comprising:
   a transmitter transmitting a part of an entangled quantum state for a coded cryptographic key through a quantum channel;
   a quantum memory storing the-remaining quantum state other than the part of the entangled quantum state; and
   an optical detector generating bit information based on a homodyne detection depending on a quantum state of light,
   wherein a receiver performs photon subtraction from the part of the entangled quantum state received through the quantum channel and then performs state detection for the part of the entangled quantum state by applying a selected quadrature, and the optical detector performs the state detection for the remaining quantum state other than the part of the entangled quantum state by applying the quadrature received from the receiver through a public channel,
   wherein the receiver controls to perform the state detection when a predetermined target photon number is subtracted for a predetermined time in performing the photon subtraction.

* * * * *